United States Patent
Lucas

(10) Patent No.: US 9,012,558 B2
(45) Date of Patent: Apr. 21, 2015

(54) MOISTURE-CURABLE, ELASTOMERIC, TRANSLUCENT SILICONE WATERPROOFING COATING AND METHOD OF MAKING THE SAME

(75) Inventor: Gary Morgan Lucas, Clifton Park, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 735 days.

(21) Appl. No.: 13/231,629

(22) Filed: Sep. 13, 2011

(65) Prior Publication Data

US 2013/0012645 A1    Jan. 10, 2013

Related U.S. Application Data

(60) Provisional application No. 61/504,806, filed on Jul. 6, 2011.

(51) Int. Cl.

| C09D 183/06 | (2006.01) |
|---|---|
| B05D 7/24 | (2006.01) |
| B05D 3/00 | (2006.01) |
| C09D 183/14 | (2006.01) |
| C08L 83/04 | (2006.01) |
| C04B 41/49 | (2006.01) |
| C08G 77/16 | (2006.01) |
| C08K 3/00 | (2006.01) |

(52) U.S. Cl.
CPC ............ *C08L 83/04* (2013.01); *C04B 41/4966* (2013.01); *C08G 77/16* (2013.01); *C08K 3/0033* (2013.01)

(58) Field of Classification Search
CPC ... C08L 2666/44; C08L 83/06; C08L 101/10; C08L 83/08; C09D 183/04; C09D 5/1675
USPC ................................. 524/493, 500; 427/385.5
See application file for complete search history.

(56) References Cited

U.S. PATENT DOCUMENTS 4,528,353 A * 7/1985 Lucas et al. ..................... 528/21

FOREIGN PATENT DOCUMENTS

| EP | 0507177 A2 | 10/1992 | |
| EP | 1043356 | * 10/2000 | ............... C08K 3/26 |
| EP | 1043356 A1 | 10/2000 | |

* cited by examiner

*Primary Examiner* — Ling Choi
*Assistant Examiner* — Chun-Cheng Wang
(74) *Attorney, Agent, or Firm* — Dominick G. Vicari; Joseph S. Ostroff

(57) ABSTRACT

There is provided herein a one-part, moisture-curable, elastomeric, translucent coating composition comprising:
(a) a di-hydroxy-terminated dimethylpolysiloxane polymer;
(b) a reinforcing filler;
(c) an organic solvent;
(d) a polyalkoxysilane crosslinking agent;
(e) an organo-silane adhesion promoter; and,
(f) a titanium condensation cure catalyst,
wherein the composition is a one-part, moisture-curable, elastomeric, translucent coating composition, and a process of making the composition.

20 Claims, 3 Drawing Sheets

Florida                    Florida: 9 months later

Florida Day                Florida: 9 months later

MOISTURE-CURABLE, ELASTOMERIC, TRANSLUCENT SILICONE WATERPROOFING COATING AND METHOD OF MAKING THE SAME

CROSS-REFERENCE TO RELATED APPLICATION

This application claims priority to International Application number PCT/US2011/51161 filed Sep. 12, 2011, which claims priority to U.S. provisional patent application Ser. No. 61/504,806 filed Jul. 6, 2011.

FIELD OF THE INVENTION

The present invention relates to elastomeric translucent waterproof coatings for the construction industry. The present invention also relates to a process of making elastomeric translucent waterproof coatings. There are also provided substrates coated with the elastomeric translucent waterproof coatings.

BACKGROUND OF THE INVENTION

Waterproof coatings are used in the construction industry to provide for weather and waterproofing protection of exterior building facades. Some waterproof coatings are pigmented-opaque calcium carbonate filled compositions that change the color/appearance of the façade of buildings when applied. Other waterproof coatings can decrease the pigmentation of the façade of buildings compared to calcium carbonate filled coatings, but these other coatings, which are largely acrylic and polyurethane based coatings, lack the necessary long-term durability and UV resistance of the filled coatings.

Thus, there exists a demand for a translucent waterproof coating that has the long-term durability and UV resistance of calcium carbonate filled waterproof coatings.

SUMMARY OF THE INVENTION

One objective of the present invention is directed to a one-part, moisture-curable, elastomeric, translucent coating composition comprising:
(a) a di-hydroxy-terminated dimethylpolysiloxane polymer;
(b) a reinforcing filler;
(c) an organic solvent;
(d) a polyalkoxysilane crosslinking agent;
(e) an organo-silane adhesion promoter; and,
(f) a titanium condensation cure catalyst,
wherein the composition is a one-part, moisture-curable, elastomeric, translucent coating composition.

Another objective of the present invention is to provide a process of forming a one-part, moisture-curable, elastomeric, translucent coating composition comprising:
combining the parts:
(a) a di-hydroxy-terminated dimethylpolysiloxane polymer;
(b) a reinforcing filler;
(c) an organic solvent;
(d) a polyalkoxysilane crosslinking agent;
(e) an organo-silane adhesion promoter; and,
(f) a titanium condensation cure catalyst
to provide a one-part moisture-curable, elastomeric, translucent coating composition.

The present invention is further described in the detailed description section provided below.

DETAILED DESCRIPTION OF THE INVENTION

Figure 1:
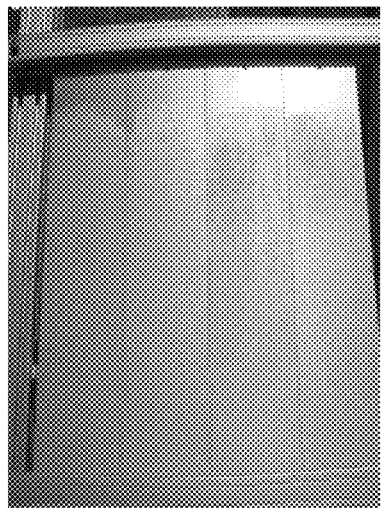
FIG. 1 shows a series of different substrates coated with the composition according to the present invention.
Figure 1:
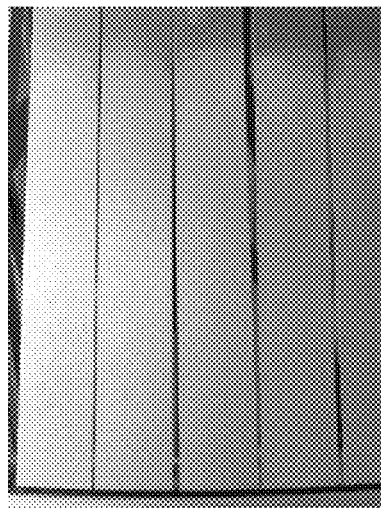
Figure 1:
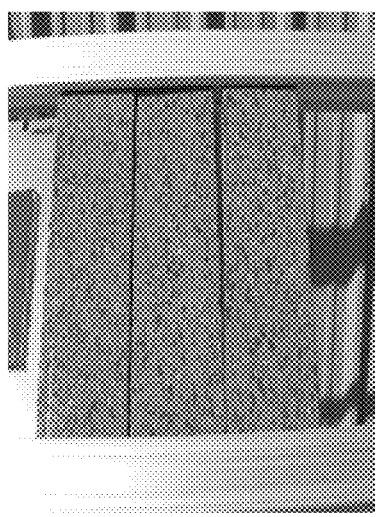
Figure 1:
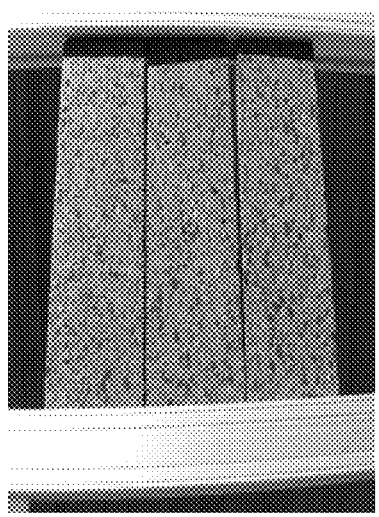

It has been unexpectedly discovered by the inventors herein that silicone-based coating compositions containing low-viscosity silicone parts can provide for elastomeric and translucent waterproof coatings that do not alter the appearance of substrates, e.g., building facades, to which they are applied but do provide long-term durability, UV resistance and resistance to wind and extreme temperatures (e.g., below 40 degrees Fahrenheit and above 85 degrees Fahrenheit)

In the specification and claims herein, the following terms and expressions are to be understood as indicated.

As used in the specification and including the appended claims, the singular forms "a," "an," and "the" include the plural, and reference to a particular numerical value includes at least that particular value, unless the context clearly dictates otherwise.

Ranges expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "aliphatic hydrocarbon" means any hydrocarbon group from which one or more hydrogen atoms has been removed and is inclusive of alkyl, alkenyl, alkynyl, cyclic alkyl, cyclic alkenyl, cyclic alkynyl, aryl, aralkyl and arenyl and may contain heteroatoms.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

It will be understood herein that all measures of viscosity are obtained at 25 degrees Celsius unless noted otherwise.

Reference is made to substances, parts, or ingredients in existence at the time just before first contacted, formed in situ, blended, or mixed with one or more other substances, parts, or ingredients in accordance with the present disclosure. A substance, part or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

In one non-limiting embodiment herein the di-hydroxy-terminated dimethylpolysiloxane polymer (a) may have the formula:

$$MD_aM$$

with the subscript a equal to or greater than 1, specifically from 1 to about 3000, more specifically from 1 to about 2000 and most specifically from 1 to about 1000 where $$M=(HO)(CH_3)_2SiO_{1/2}; \text{ and,}$$

$$D=(CH_3)_2SiO_{2/2}.$$

In one non-limiting embodiment herein the di-hydroxy-terminated dimethylpolysiloxane polymer (a) may have a viscosity of less than about 200,000 cps, specifically less than about 100,000 cps, more specifically less than about 50,000 cps and most specifically less than about 5,000 cps wherein each of said ranges having a lower endpoint of greater than zero, such as 1 cps or 5 cps. In one non-limiting embodiment herein the di-hydroxy-terminated dimethylpolysiloxane polymer (a) may be a mixture of di-hydroxy-terminated dimethylpolysiloxane polymers each having a different viscosity. For example, the di-hydroxy-terminated dimethylpolysiloxane polymer part (a) may comprises one or more lower viscosity di-hydroxy-terminated dimethylpolysiloxane polymers having a viscosity of from about 1 cps or 5 cps up to about 750 cps, preferably from about 50 cps up to about 600 cps, wherein such a di-hydroxy-terminated dimethylpolysiloxane polymer is in admixture with one or more higher viscosity di-hydroxy-terminated dimethylpolysiloxane polymers having a viscosity of from about 1,000 cps to about 5,000 cps, preferably from about 2,000 cps to about 4,000 cps.

The level of incorporation of the di-hydroxy-terminated dimethylpolysiloxane polymer (a) ranges from slightly above 0 weight % to about 80% weight %, more preferably from about 20% weight % to about 70% weight %, and most preferably from about 40% weight % to about 60% weight % of the total one-part, moisture-curable, elastomeric, translucent coating composition.

The one-part, moisture-curable, elastomeric translucent coating composition of the present invention may also comprise a reinforcing filler (b). The reinforcing filler (b) useful in the present invention is a filler or mixture of fillers that is selected from those known to be useful in silicone compositions, provided they do not significantly impair the translucency of the coating, i.e., that a substrate coated maintains its original appearance following application of the coating thereof.

The fillers (b) include ground, precipitated and colloidal calcium carbonates which are treated with compounds such as stearate or stearic acid; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite for example.

Preferably, the filler (b) is silica filler, such as a silica filler doubly treated with D4 and hexamethyldisilazane. The type of filler will determine the amount of filler that is included in the one-part, moisture-curable, elastomeric, translucent coating composition of the present invention. The amount of filler useful in the present invention is generally from about 2 weight % to about 20 weight %, more preferably from about 5 weight % to about 15 weight %, and most preferably from about 8 weight % to about 12 weight % of the total one-part, moisture-curable, elastomeric, translucent coating composition. The filler may be a single species or a mixture of two or more species.

The one-part, moisture-curable, elastomeric, translucent coating composition of the present invention may also comprise an organic solvent (c) such as for example, a linear aliphatic hydrocarbon solvent. One example of organic solvent (c) can be C12-C14 aliphatic hydrocarbon fluid.

The level of incorporation of organic solvent (c) ranges from about 0 weight % to about 60 weight %, more preferably from about 5 weight % to about 50 weight %, and most preferably from about 20 weight % to about 40 weight % of the one-part, moisture-curable, elastomeric, translucent coating composition.

The one-part, moisture-curable, elastomeric, translucent coating composition of the present invention may also comprise a VOC exempt dialkyl cyclic siloxane. Examples of cyclic siloxane solvents can be for example hexamethylcyclotetrasiloxane or octamethylcyclopentasiloxane.

The level of incorporation of VOC exempt dialkylcyclosiloxanes ranges from about 0 weight % to about 60 weight %, more preferably from about 5 weight % to about 50 weight %, and most preferably from about 20 weight % to about 40 weight of the one-part, moisture-curable, elastomeric, translucent coating composition.

The one-part, moisture-curable, elastomeric, translucent coating composition of the present invention may also comprise polyalkoxysilane crosslinking agent (d) which generally has the formula:

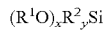

$(R^1O)_x R^2_y Si$ where $R^1$ and $R^2$, are independently chosen monovalent C1 to C60 hydrocarbon radicals, such as methyl, ethyl, propyl, isopropyl, butyl, tert-butyl, sec-butyl and the like, and where x is 2, 3, or 4 and y is zero, one or two, provided that x+y=4. One specific example of the polyalkoxysilane crosslinking agent (d) is methyltrimethoxysilane.

The level of incorporation of the polyalkoxysilane crosslinking agent (d) ranges from about 0.5 weight % to about 10 weight %, more preferably from about 1 weight % to about 5 weight %, and most preferably from about 1.5 weight % to about 3 weight % of the total one-part, moisture-curable, elastomeric, translucent coating composition.

The one-part, moisture-curable, elastomeric, translucent coating compositions of the present invention may also comprise an organo-silane adhesion promoter (e), the preferred organo-silane adhesion promoter (e) being 1,3,5-tris(tri-methoxysil-ylpropyl)isocyanurate. Other organo-silane adhesion promoters (e) useful in the present invention are: n-2-aminoethyl-3-aminopropyltriethoxysilane, gamma.-aminopropyltriethoxysilane, gamma-aminopropyltri-methoxysilane, aminopropyltrimethoxysilane, bis-gamma-trimethoxysilypropylamine, N-Phenyl-gamma-aminopropyltrimethoxysilane, triaminofunctionaltrimethoxysilane, gamma-aminopropyl-methyldiethoxysilane, gamma-aminopropylmethyldiethoxysilane, methacryloxypropyltrimethoxysilane, methylami-nopropyltrimethoxysilane, gamma-glycidoxypropylethyldimethoxysilane, gamma-glycidoxypropyltrimethoxysilane, gamma-glycidoxyethyltrimethoxysilane, beta-(3,4-epoxycyclohexyl)propyltrimethoxysilane, beta-(3,4-epoxycyclohexyl) ethylmethyldimethoxysilane, isocyanatopropyltriethoxysilane, isocyanatopropylmeth-yldimethoxysilane, beta-cyanoethyltrimethoxysilane, gamma-acryloxypropyltrimethoxysilane, gamma-methacry-loxypropylmethyldimethoxysilane, 4-amino-3,3,-dimethyl-butyltrimethoxysilane, and n-ethyl-3-trimethoxysilyl-2-me-thylpropanamine.

The level of incorporation of the organo-silane adhesion promoter (e) ranges from about 0.1 weight % to about 5.0 weight %, more preferably from about 0.5 weight % to about 4.0 weight %, and most preferably from about 1.0 weight % to about 2.0 weight % of the total one-part, moisture-curable, elastomeric, translucent coating composition.

The one-part, moisture-curable, elastomeric, translucent coating composition of the present invention also comprises a titanium condensation cure catalyst (f). The titanium condensation cure catalyst (f) can be any titanium condensation cure catalyst known to be useful for facilitating crosslinking in silicone compositions. In one embodiment, chelated titanium compounds, for example, 1,3-propanedioxytitanium bis (ethylacetoacetate); di-isopropoxytitanium bis(ethylacetoacetate); and tetra-alkyl titanates, for example, tetra n-butyl titanate and tetra-isopropyl titanate, can be used as the titanium condensation cure catalyst (f).

The level of incorporation of the titanium condensation cure catalyst (f), ranges from about 0.1 weight % to about 5.0 weight %, more preferably from about 0.5 weight % to about 4.0 weight %, and most preferably from about 1.0 weight % to about 3.0 weight % of the total one-part, moisture-curable, elastomeric, translucent coating composition.

It will be understood herein that the term "one-part" in the expression one-part, moisture-curable, elastomeric, translucent coating composition means that all of the parts (a)-(f) are in contact with each other and have not been separated in any fashion.

It will be understood herein that the term "moisture-curable" in the expression one-part, moisture-curable, elastomeric, translucent coating composition means that the composition can achieve at least some level of cure following exposure to at least atmospheric moisture. In one embodiment, the one-part, moisture-curable, elastomeric, translucent coating composition can cure to a non-tacky state in a period of from about 5 minutes to about 8 hours, specifically from about 10 minutes to about 4 hours and most specifically from about 15 minutes to about 2 hours at a temperature of 25 degrees Celsius when exposed to atmospheric moisture.

In one embodiment herein it will be understood that the one-part, moisture-curable, elastomeric, translucent coating composition can self-bond to a substrate when applied thereto, i.e., the coating composition does not require any additional presence of a bonding layer or bonding material or other chemical or physical means of attachment for proper coating of the substrate.

The process of forming the one-part, moisture-curable, elastomeric, translucent coating composition herein can comprise combining the parts (a)-(f). Such a combination can take place piece-meal over time or simultaneously.

Furthermore, the one-part, moisture-curable, elastomeric, translucent coating compositions described herein can be prepared (e.g., combined) using either batch or continuous modes of manufacture. Preferably, the ingredients such as dihydroxy-terminated dimethylpolysiloxane polymer (a), reinforcing filler (b), organic solvent (c), polyalkoxysilane crosslinking agent (d), organo-silane adhesion promoter (e), titanium condensation cure catalyst (f) and any optional plasticizers, process aids, and other additives are combined in a continuous compounding extruder to produce the desired one-part, moisture-curable, elastomeric, translucent coating composition. The continuous compounding extruder can be any continuous compounding extruder such as the twin screw Werner-Pfleiderer/Coperion extruder, or a Buss, or P.B. Kokneader extruder.

In the broadest conception of the present invention, all the ingredients may be mixed in the continuous compounding extruder. In such a process, which is continuous, the extruder is operated at a range of from about 50 degrees C. to about 100 degrees C., but more preferably in the range of from about 60 degrees C. to about 80 degrees C., and even more preferably, the extruder is operated at a partial vacuum so as to remove any volatiles during the mixing process.

The compositions herein can be formulated as clear, translucent compositions. The term clear or transparent according to the present invention is intended to connote that a translucent coating of the present invention allows ready viewing of the substrate on which it is coated. By contrast, an opaque composition renders it impossible to clearly view a substrate which has been coated with the opaque composition, and significantly impairs the appearance of the substrate following the coating thereof. Thus, according to the present invention, there are differences between transparent (clear) and opaque compositions. These differences can be noted by the naked eye in the manner indicated herein and as is known to those skilled in the art.

The compositions herein can be formulated as elastomeric compositions. The term elastomeric according to the present invention is understood to mean that the composition when applied to a substrate can provide for effective UV, weather and water protection without excessive hardening of the coating over time which can result in visible pitting, cracking and flaking of the coating from the substrate. Such elastomeric properties of the coating can be appreciated by those skilled in the art by visible inspection of the coating. In one embodiment, the elastomeric advantages of the coating composition can be provided when the coating provides the herein described levels of modulus and elongation, as well as the levels of stability and UV resistance described herein.

The process of forming the one-part, moisture-curable, elastomeric, translucent coating composition herein can further comprise applying the combined parts of the coating composition (a)-(f) onto a substrate.

In one embodiment herein the substrate can comprise any material that may be on the face of a building or structure that is sought to be waterproofed and/or weather protected, such as concrete, brick, wood, metal, glass, plastic, stone, mortar, painted substrates, and the like.

In another embodiment the amount of coating applied to a substrate can depend on several factors such as the type of substrate, the temperature, the humidity, the desired degree of waterproofing, and the specific parts of the one-part, moisture-curable, elastomeric, translucent coating composition. In one embodiment, the amount of coating is from about 10 to about 0.1 millimeters, preferably from about 5 to about 0.5 millimeters and most preferably from about 2 to about 0.2 millimeters.

The one-part, moisture-curable, elastomeric translucent coating compositions herein can be applied by any means commonly known and used by those skilled in the art, such as for example, rolling or spraying.

The process of forming the one-part, moisture-curable, elastomeric, translucent coating composition herein can even further comprise exposing the coating composition to sufficient moisture to provide for curing of the one-part, moisture-curable, elastomeric, translucent coating composition into a cured coating onto the substrate.

Sufficient moisture can comprise at least atmospheric moisture and can extend to any level of moisture necessary to achieve a level of cure of the one-part, moisture-curable, elastomeric, translucent coating composition to a non-tacky state as noted in the above-described periods of time. Exposing the coating composition to sufficient moisture can be conducted in any manner that is commonly used in the coating of substrates as would be known by those skilled in the art.

In one embodiment there is provided a substrate containing a cured coating made by the process described herein.

In one embodiment herein the coating on the substrate herein can have a modulus at 50% elongation per ASTM D-412 of from about 40 psi to about 150 psi.

In one other embodiment herein the coating on the substrate herein can have a Shore A durometer value per ASTM C-661 of from about 10 to about 40.

In one other embodiment herein the coating on the substrate herein can have a lap shear adhesion value per ASTM C-961 of from about 40 psi to about 140 psi.

In yet another embodiment herein the coating on the substrate can have a translucency, which is greater than that of coating of an identical substrate, coated with an identical coating composition wherein di-hydroxy-terminated dimethylpolysiloxane polymer (a) has a viscosity of greater than 200,000 cps.

In yet another embodiment herein the coating on the substrate can have a one or more of a durability or UV resistance, which is greater than that of coating of an identical substrate, coated with an identical coating composition wherein di-hydroxy-terminated dimethylpolysiloxane polymer (a) has a viscosity of greater than 200,000 cps. In one embodiment the coating on the substrate has a UV resistance of at least 6 months, specifically at least 9 months, more specifically at least one year, most specifically at least 5 years. UV resistance is understood to be that the coated substrate does not suffer from visible cracking, pitting, or peeling of the applied coating.

In yet another embodiment herein the coating on the substrate can provide water proofing protection for a longer period of time than that of coating of an identical substrate coated with an identical coating composition wherein di-hydroxy-terminated dimethylpolysiloxane polymer (a) has a viscosity of greater than 200,000 cps. Water proofing protection can comprise water impermeability. In one embodiment, the period of time can be such as that described for UV resistance.

In yet another embodiment herein the coating on the substrate can maintains the original appearance of the substrate more so than that of an identical substrate coated with an identical coating composition wherein di-hydroxy-terminated dimethylpolysiloxane polymer (a) has a viscosity of greater than 200,000 cps.

In another embodiment herein the one-part, moisture-curable, elastomeric, translucent coating composition can have an improved shelf stability over identical compositions which do not employ the di-hydroxy-terminated dimethylpolysiloxane polymer (a) having a viscosity of greater than 200,000 cps described herein. In one non-limiting embodiment the one-part, moisture-curable, elastomeric, translucent coating composition can have a shelf stability of at least one month, specifically at least 3 months and more specifically at least six months at a temperature of 50 degrees Celsius.

In one embodiment herein, the one-part, moisture-curable, elastomeric, translucent coating compositions herein can provide the substrate protection against extreme temperatures. An extreme temperature as described herein can be below 40 degrees Fahrenheit, and more specifically below 20 degrees Fahrenheit. In another embodiment herein an extreme temperature as described herein can be above 80 degrees Fahrenheit, specifically above 90 degrees Fahrenheit. The one-part, moisture-curable, elastomeric, translucent coating compositions herein can provide such extreme temperature protection for periods such as those described herein for the UV resistance.

The one-part, moisture-curable, elastomeric, translucent coating compositions herein can be used as coating materials for buildings, specifically, building facades where waterproofing and/or weather protection of the coated material can be used to protect and maintain the original appearance of the building façade.

In one non-limiting embodiment herein, the one-part, moisture-curable, elastomeric, translucent coating composition can be in the absence of water. In yet another embodiment, the composition can be in the absence of any and all minor amounts of water that is used in compositions outside the scope of the invention herein.

In one further embodiment herein there is provided an emulsion that contains the one-part, moisture-curable, elastomeric, translucent coating composition described herein. Specifically, this emulsion is a non-aqueous silicone emulsion.

The emulsification of the one-part, moisture-curable, elastomeric, translucent coating composition into a form that can be suitable to apply to the substrate as described herein, can be those which are known in the art, and specifically wherein the noted mixers, blenders or shakers are located in a continuous or batch production line and/or within a larger industrial apparatus.

Further details of methods of emulsification are well known in the art and shall not be detailed herein.

In one embodiment the one-part, moisture-curable, elastomeric, translucent coating composition is clear or translucent following mixing of the contents of the composition. The mixed composition or emulsion containing the composition can have the noted shelf stability and other noted properties herein and can be in the absence of water as discussed herein.

In another embodiment herein there is also provided a method of treating a building façade comprising applying to an exterior portion of the building façade the one-part, moisture-curable, elastomeric, translucent coating composition described herein and curing the coating composition to provide a cured coating on the building facade.

There is also provided a building façade containing the cured coating described herein.

EXAMPLES

The example below is provided for the purpose of illustrating the present invention. All parts and/or percentages in the examples are parts by weight (pbw). A continuous compounding extruder was utilized in the manufacture of the one-part moisture curable, elastomeric, translucent coatings. The continuous compounding extruder was a 30 mm Coperion (formerly Werner-Pfleiderer) Twin-Screw extruder. The resulting one-part, moisture curable, silicone coating compositions exhibited shelf-stable, fast curing, self-bonding characteristics with translucent/clear appearance once applied to the substrate. The silicone coating composition was tested for stability by measuring the viscosity of the compositions before, during, and after a 6-month storage period at 50 degrees Celsius. The compositions were packaged in a sealed aluminum can and placed in a 50 degree Celsius oven. Viscosities were measured at 1-month intervals. The compositions were also tested for modulus at 50% elongation per ASTM D-412, Durometer per ASTM C-661, tensile adhesion per ASTM C-1135 and lap shear adhesion per ASTM C-961. All adhesion testing was done on an Instron Model 4465 testing machine.

In example 1, there was continuously fed into barrel 1 of the extruder, 30 pbw of a 3000 cps PDMS polymer available from MPM, 23.5 pbw of a 500 cps PDMS polymer available from MPM, and 10 pbw of a D4 and hexamethyldisilazane treated fumed silica filler. Into barrel 6 of the extruder there was continuously fed 15 pbw of a C12-C14 aliphatic hydrocarbon fluid available from Penreco Inc and 15 pbw of a D5 VOC-exempt siloxane fluid available from MPM.

Into barrel 7 of the extruder there was continuously fed 3.75-pbw of methyltrimethoxysilane crosslinker, 0.75 pbw tris-trimethoxypropylisocyanurate adhesion promoter, and 2.0 pbw diisopropoxytitanium bis-acetylacetonate condensation cure catalyst.

| C560 Viscosity, cps | 7,120 |
|---|---|
| E-63 TFT, minutes | 30 |
| Appearance | Translucent/clear |

The processing temperature of the extruder was maintained at 50 degrees Celsius and the production rate was 40 lb/hr. A de-airing vacuum (25 inches Hg) was applied at barrel 10 of the extruder. The finished composition was packaged into polyethylene cartridges and allowed to equilibrate for 4 days at room temperature prior to testing. Testing results are summarized in the following table:

Sheet Physicals (7 Day Cure)

| E-1 Tensile, psi | 180 |
|---|---|
| E-1 Elongation, % | 150 |
| E-3 Shore A | 25 |
| 50% Modulus | 65 |
| VOC's (gm/L) | 186 |
| Specific Gravity | 0.9773 |
| Flash Point (deg. C.) | 60 |

The composition of example 1 was spray applied to brick and aluminum substrates and put on outdoor exposure in Florida. After 9 months exposure there is no change in appearance of the coating as shown in FIG. 1.

Figure 3:
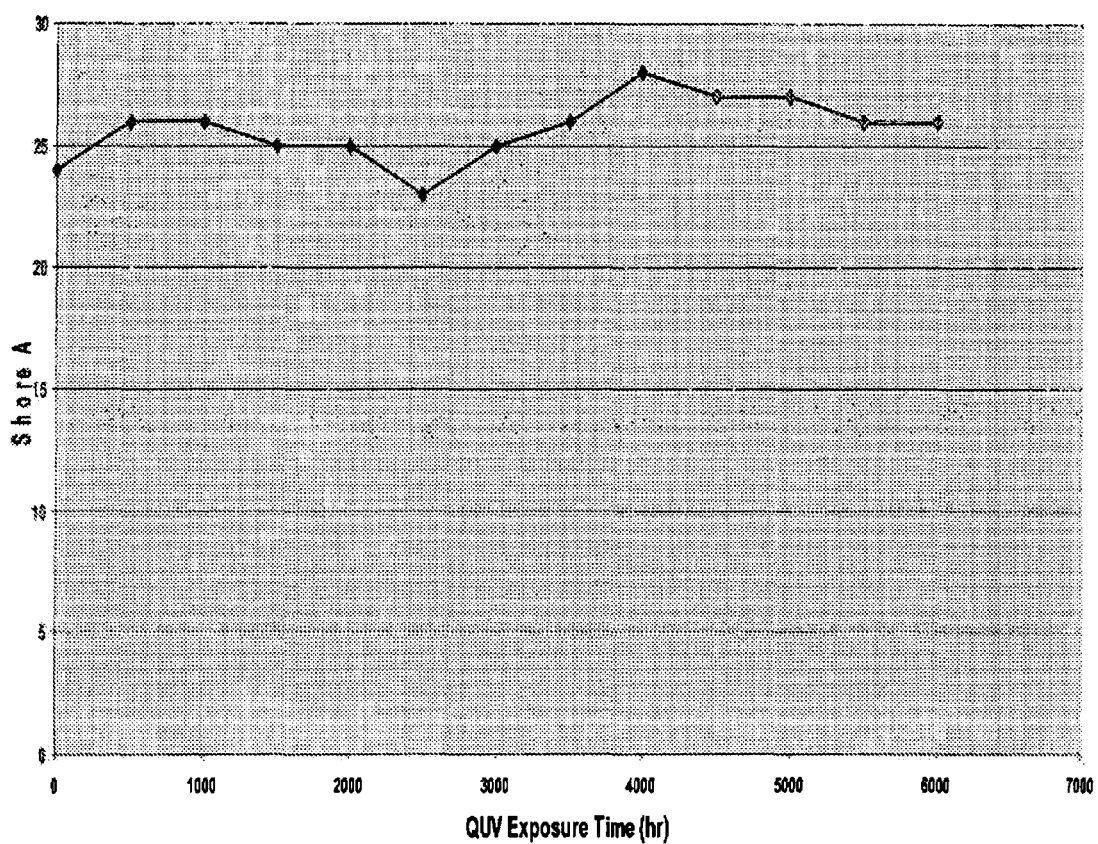

Cured ⅛ thick sheets of experiment 1 were placed in an Atlas 2000 QUV weatherometer and a Shore A durometer reading was measured on the sheets every 500 hours for a total of 6,000 hours of weatherometer exposure time. Results are shown in FIG. 3.

The Atlas 200 Weatherometer and Florida exposure testing results demonstrate that the moisture-curable, translucent, silicone coating composition of claim 1 has excellent resistance to UV typical of a 100% silicone.

Figure 2:
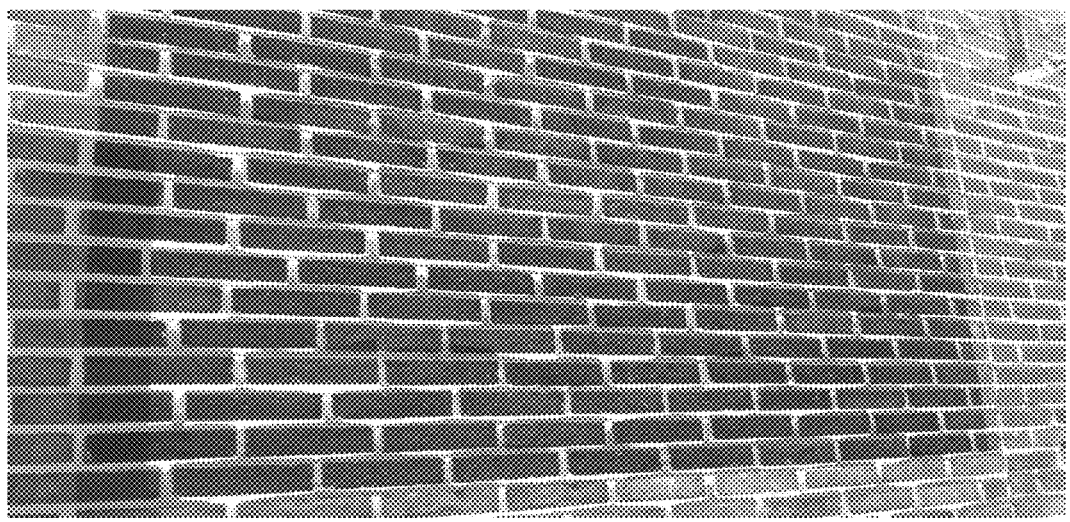
FIG. 2 shows a brick wall coated with the composition according to the present invention.

The composition of example 1 was roll-coated on a brick mock-up façade to give the desired "new brick" appearance and to provide long term weatherproofing as shown in FIG. 2.

While the invention has been described with reference to a preferable embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A one-part, moisture-curable, elastomeric, translucent coating composition comprising:
    (a) a di-hydroxy-terminated dimethylpolysiloxane polymer having a viscosity of less than about 5,000 cps at 25 degrees Celsius;
    (b) a reinforcing filler;
    (c) an organic solvent;
    (d) a polyalkoxysilane crosslinking agent;
    (e) an organo-silane adhesion promoter; and, (f) a titanium condensation cure catalyst,
wherein the composition is a one-part, moisture-curable, elastomeric, translucent coating composition.

2. The coating composition of claim 1 wherein the reinforcing filler (b) is fumed silica filler doubly treated with D4 and hexamethyldisilazane.

3. The coating composition of claim 1 wherein the organic solvent (c) is a linear aliphatic hydrocarbon.

4. The coating composition of claim 1 wherein the polyalkoxysilane crosslinking agent (d) is methyltrimethoxysilane.

5. The coating composition of claim 1 wherein the organo-silane adhesion promoter (e) is tris-trimethoxysilylpropylisocyanurate.

6. The coating composition of claim 1 wherein the titanium curing catalyst is di-isopropyl titanium bis-acetylacetonate.

7. The coating composition of claim 1 which has a stability of at least 1 month.

8. A process of forming a one-part, moisture-curable, elastomeric, translucent coating composition comprising:
    combining the parts;
        (a) a di-hydroxy-terminated dimethylpolysiloxane polymer having a viscosity of less than about 5,000 cps at 25 degrees Celsius;
        (b) a reinforcing filler;
        (c) an organic solvent;
        (d) a polyalkoxysilane crosslinking agent;
        (e) an organo-silane adhesion promoter; and,
        (f) a titanium condensation cure catalyst
    to provide a one-part moisture-curable, elastomeric, translucent coating composition.

9. The process of claim 8 further comprising:
    applying the combined parts of the coating composition onto a substrate; and,
    exposing the coating composition to sufficient moisture to provide for curing of the one-part, moisture-curable, elastomeric, translucent coating composition into a cured coating onto the substrate.

10. A substrate containing the cured coating made by the process of claim 9.

11. The substrate of claim 10 wherein the coating has a modulus at 50% elongation per ASTM D-412 of from about 40 psi to about 150 psi.

12. The substrate of claim 10 wherein the coating has a Shore A durometer value per ASTM C-661 of from about 10 to about 40.

13. The substrate of claim 10 wherein the coating has a translucency which is greater than that of coating of an identical substrate coated with an identical coating composition.

14. The substrate of claim 10 wherein the coating has one or more of a durability or UV resistance which is greater than that of coating of an identical substrate coated with an identical coating composition.

15. The substrate of claim 10 wherein the coating provides water proofing protection for a longer period of time than that of coating of an identical substrate coated with an identical coating composition.

16. The substrate of claim 10 wherein the coating maintains the original appearance of the substrate more so than that of an identical substrate coated with an identical coating composition.

17. A method of treating a building façade comprising applying to an exterior portion of the building façade a one-part, moisture-curable, elastomeric, translucent coating composition comprising:
    (a) a di-hydroxy-terminated dimethylpolysiloxane polymer;
    (b) a reinforcing tiller;
    (c) an organic solvent;
    (d) a polyalkoxysilane crosslinking agent;
    (e) an organo-silane adhesion promoter; and,
    (f) a titanium condensation cure catalyst,
and curing the coating composition to provide a cured coating on the building facade.

18. A building facade containing the cured coating of claim 17.

19. A one-part, moisture-curable, elastomeric, translucent coating composition comprising:
    (a) a di-hydroxy-terminated dimethylpolysiloxane polymer;
    (b) a reinforcing filler which is fumed silica filler doubly treated with D4 and hexamethyldisilazane;
    (c) an organic solvent;
    (d) a polyalkoxysilane crosslinking agent;
    (e) an organo-silane adhesion promoter; and,
    (f) a titanium condensation cure catalyst,
wherein the composition is a one-part, moisture-curable, elastomeric, translucent coating composition.

20. A one-part, moisture-curable, elastomeric, translucent coating composition comprising:
    (a) a di-hydroxy-terminated dimethylpolysiloxane polymer;
    (b) a reinforcing filler;
    (c) an organic solvent;
    (d) a polyalkoxysilane crosslinking agent;
    (e) an organo-silane adhesion promoter; and,
    (f) a titanium condensation cure catalyst which is di-isopropyl titanium bis-acetylacetonate,
wherein the composition is a one-part, moisture-curable, elastomeric, translucent coating composition.

* * * * *